Dec. 30, 1930. G. HANSEN 1,787,269
DEVICE FOR PARTIAL DEFLECTION OF A CONICAL PENCIL OF IMAGING RAYS
Filed April 17, 1929
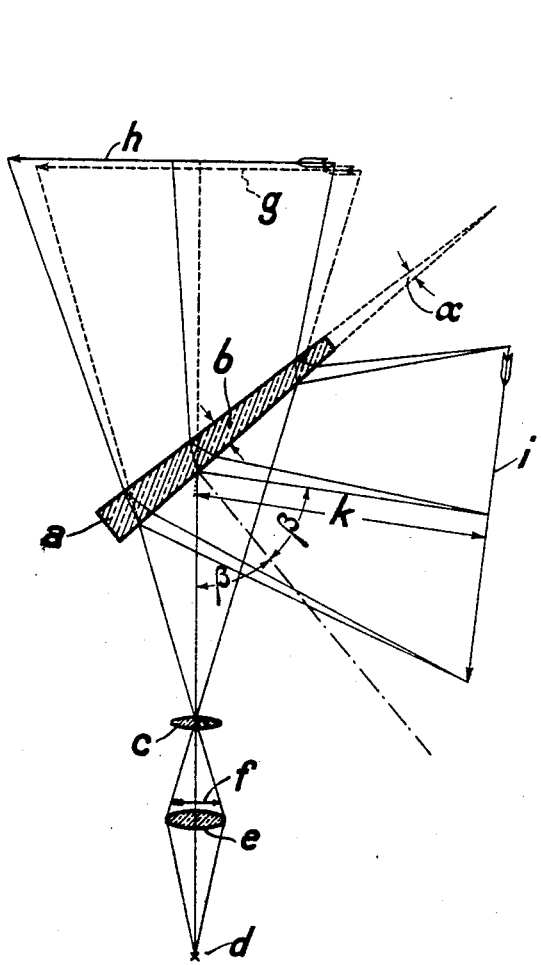
Inventor:
Gerhard Hansen.

Patented Dec. 30, 1930

1,787,269

UNITED STATES PATENT OFFICE

GERHARD HANSEN, OF JENA, GERMANY, ASSIGNOR TO THE FIRM: CARL ZEISS, OF JENA, GERMANY

DEVICE FOR PARTIAL DEFLECTION OF A CONICAL PENCIL OF IMAGING RAYS

Application filed April 17, 1929, Serial No. 355,965, and in Germany April 23, 1928.

It is a well-known fact that, for separating part of the rays from a conical pencil of imaging rays, the application of a plano-parallel glass plate, whose rear surface may be provided with a translucent mirror, has the disadvantage of rays being reflected by both surfaces. If no provision were made to destroy one of the two reflected ray pencils, which, however, causes a certain loss, double images would be the result. The said loss can be avoided if, instead of being converging or diverging, the rays of the imaging pencil are made to be parallel to each other. For this reason the proposal was made that the imaging rays should run parallel to each other within a certain part of their path and divide in the said part. In such a way and in spite of the fact that now the two pencils of imaging rays that are reflected on the surfaces of the mirror can be utilized, the losses are restricted but by no means completely avoided, because the additional lenses, that to produce such an effect had to be provided in the path of the rays, give rise to new sources of losses, which, owing to the strong magnification of the image, that frequently is made necessary here, prove to be disadvantageous especially in the miscroscopic and microphotographic path of the imaging rays.

To completely avoid the said losses is the aim of the invention. This aim is attained when, according to the invention, there is used as a mirror a wedge-shaped plate of glass or similar transparent material having dimensions that will allow the two partial pencils of rays reflecting on its surfaces to combine in one image plane and to cover the whole desired image field. This condition is met when the effective part of the mirror is given such a medial thickness and its wedge-angle as well as the angle at which the rays fall on the mirror are given such sizes that always the two partial rays reflected on the surfaces, which belong to any of the incident imaging rays, intersect in one point in the image plane. Here the values of the dimensions of the mirror depend upon what material is used, that is to say upon the refractive index of this material.

The drawing illustrating the invention schematically represents a section of a constructional example of a device for partial deflection of a conical pencil of imaging rays. This device can be applied f. i. when a microscopic image of an object should be photographed, and this without the necessity of interrupting the microscopic examination of the object during the period required for photographing.

The device consists of a glass-wedge $a$ whose medial thickness and wedge angle are $b$ and $\alpha$ respectively. The said glass-wedge $a$ is provided in a path of microscopic rays and behind the microscope objective $c$ with which a source of light $d$ and an illuminating condenser $e$ are associated. The angle the axial ray incident on the glass-wedge $a$ forms with the corresponding normal of incidence is denominated $\beta$.

The path of the imaging rays is the following: Of an object which is indicated by an arrow $f$ and supposed to lie behind the condenser $e$, the microscope objective $c$ would project a magnified image which is represented on the drawing by a dash-line arrow $g$. In consequence of the application of the glass-wedge $a$ and owing to the deflection of the imaging rays, which is caused by the wedge, the said image appears less intensive in a displaced position $h$, whereas part of the imaging rays are reflected on the two surfaces of the glass-wedge $a$, whereby on the front surface the medial angle of reflection is equal to the angle of incidence $\beta$. Now the glass-wedge $a$ itself and its position in the path of the rays are to be fixed in such a manner that the medial distance $k$ of the image plane from the glass-wedge $a$, the medial thickness $b$ of the glass-wedge, its wedge-angle $\alpha$, its refractive index $n$ and the angle $\beta$ at least approximately come up to the following Equation (1) which is known in connection with interference instruments:

$$(1) \quad k = \frac{b}{\alpha} \cdot \frac{\sin \beta \cdot \cos^2 \beta}{n^2 - \sin^2 \beta},$$

This means, when the medical thickness $b$ of the glass wedge $a$ and the wedge angle $\alpha$ are given, a certain value of the medial distance $k$ corresponds to a certain value of the angle of incidence $\beta$. In consideration of a correct combination of the imaging rays of light reflected on the two surfaces of the glass wedge $a$ not only in the optical axis but also outside the same, the angle of incidence $\beta$ is conveniently given such a value that the medial distance $k$ has a maximal value. The distance $k$, however, is a maximal one as soon as the differential quotient $$\frac{dk}{d\beta}$$

is infinitely small, viz. as soon as the differential quotient of the second factor $$\frac{\sin\beta \cdot \cos^2\beta}{n^2 - \sin^2\beta}$$

on the right side of the Equation (1) is infinitely small. When giving this factor the designation $f(\beta)$ the following relation holds good:

$$(2) \quad f(\beta) = \frac{\sin\beta \cdot \cos^2\beta}{n^2 - \sin^2\beta}.$$

By means of this relation the differential quotient $$\frac{df(\beta)}{d\beta}$$

can be deduced:

$$(3) \quad \frac{df(\beta)}{d\beta} = \cos\beta \cdot \frac{(n^2-\sin^2\beta)(1-3\sin^2\beta)+2\sin\beta(\sin\beta-\sin^3\beta)}{(n^2-\sin^2\beta)^2}$$

The relations $$(3a) \quad \cos\beta = 0$$

$$(3b) \quad \frac{1}{(n^2-\sin^2\beta)^2} = 0$$

furnishing values that cannot be used for $n$ and $\beta$, the differential quotient $$\frac{df(\beta)}{d\beta}$$

can be infinitely small only when relation (4) is arrived at:

$$(4) \quad (n^2-\sin^2\beta)(1-3\sin^2\beta)+2\sin\beta(\sin\beta-\sin^3\beta)=0.$$

When transforming the Equation (4), the Equation (5) is arrived at:

$$(5) \quad 2\sin^2\beta = 3n^2 - 1 - \sqrt{(1-3n^2)^2 - 4n^2}.$$

With regard to the usual kinds of glass this latter Equation (5) is complied with when $$\beta = 40° \text{ to } 41°.$$

When the distance $k$ is given, a value as low as possible is to be chosen for $b$ and this in order not to have new image defects in the imaging process when applying the glass-wedge.

I claim:

A device for partial deflection of a conical pencil of imaging rays and for combination of the deflected rays in a plane having from the locus of deflection a medial distance $k$, consisting of a wedge of transparent material, whereby of the medial thickness $b$ of the said wedge, its wedge-angle $\alpha$, its refractive index $n$ and the angle $\beta$, at which the axial ray falls on the wedge, at least approximately the two following equations are complied with:

$$k = \frac{b}{\alpha} \cdot \frac{\sin\beta \cdot \cos^2\beta}{n^2 - \sin^2\beta},$$

$$2\sin^2\beta = 3n^2 - 1 - \sqrt{(1-3n^2)^2 - 4n^2}.$$

GERHARD HANSEN.